Oct. 9, 1962

H. C. FOREMAN 3,057,095

THREE-DIMENSIONAL DISPLAY DEVICE

Filed June 28, 1960

INVENTOR.
H. CLIFTON FOREMAN
BY
Caesar and Rivise
ATTORNEYS.

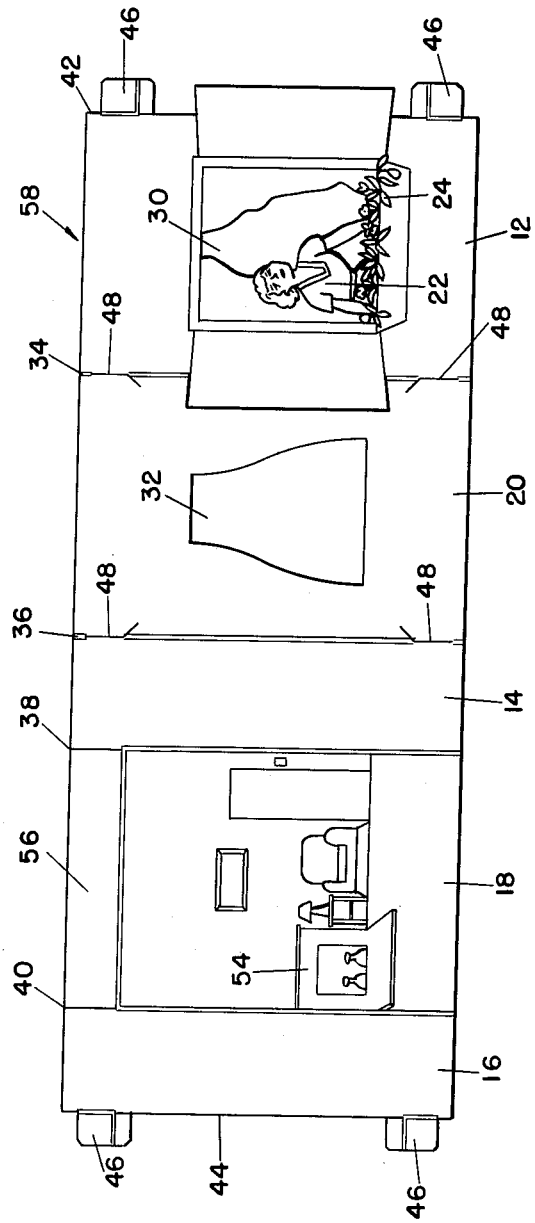

Oct. 9, 1962 H. C. FOREMAN 3,057,095
THREE-DIMENSIONAL DISPLAY DEVICE
Filed June 28, 1960 3 Sheets-Sheet 3
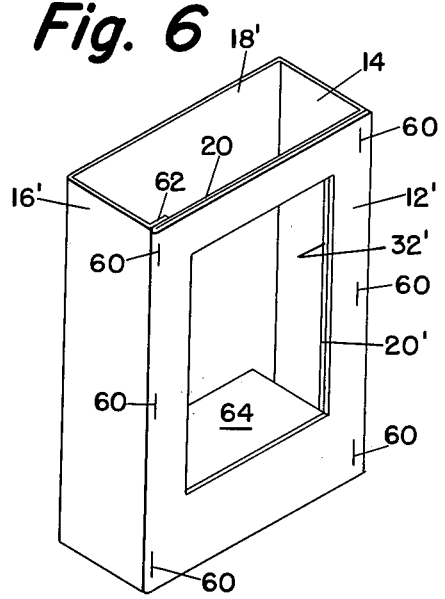
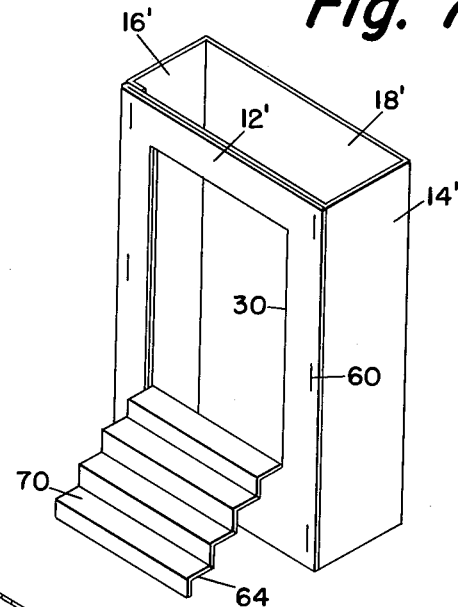
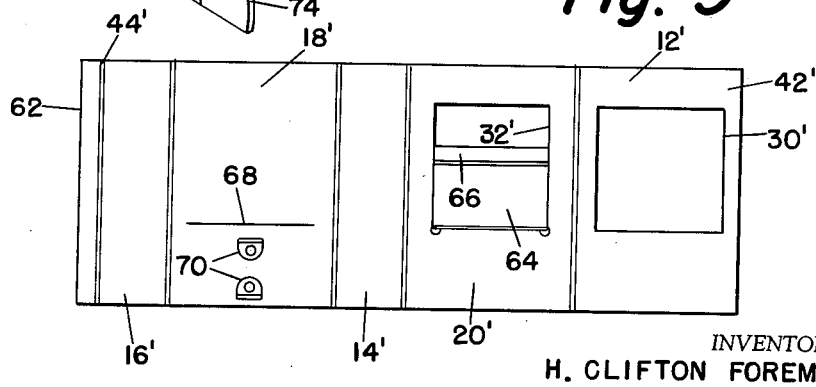
INVENTOR.
H. CLIFTON FOREMAN
BY
Caesar and Rivise
ATTORNEYS.

3,057,095
THREE-DIMENSIONAL DISPLAY DEVICE
Henry Clifton Foreman, 1104 Faun Road,
Wilmington 3, Del.
Filed June 28, 1960, Ser. No. 39,292
9 Claims. (Cl. 40—124.1)

This invention relates to a three-dimensional display device and more particularly to an improved device of this general class.

It has been found that three-dimensional display devices possess an attractiveness and distinctiveness usually not obtainable in two-dimensional signs or display devices. For this reason the additional expenses entailed in connection with the three-dimensional display devices have been proved to be justified by their enhanced advertising value.

However, prior art three-dimensional display devices have always required that printed matter be imposed on both sides of the blank which was subsequently folded and assembled into the completed three-dimensional display device.

Accordingly, it is an object of the present invention to provide a three-dimensional display device which may be assembled from a blank which has printed matter on but one of its sides.

Another object of the present invention is to provide a three-dimensional display device assembled from a blank having printed matter on but one side and having its other side unfinished and unprinted.

Still another object of the present invention is to provide a three-dimensional display device of simple construction and low cost and which is easily assembled and disassembled.

Yet another object of the present invention is to provide a three-dimensional display device which may be more quickly printed and in addition may be printed by using one-half of the printing plates normally required for this type of device.

Another object of the present invention is to provide a three-dimensional display device which is self-standing and which does not require an easel.

Still another object of the present invention is to provide a three-dimensional display device which is so constructed to include a section which may serve either as a shelf therein or which may be brought to the front of the device.

The foregoing objectives are achieved by providing a three-dimensional display device which includes a first display panel having a central opening therein, a first non-display panel having a central aperture complementary with said central opening and being hingedly associated with said first display panel along a common edge, a second non-display panel hingedly associated with said first non-display panel along a common edge, a second display panel hingedly associated with said second non-display panel along a common edge and a third non-display panel hingedly associated with said second display panel along a common edge. The first display panel and the third non-display panel are provided with tabs along their free edges. The tabs are adapted to lockingly interfit with complementary slits formed in the first non-display panel. The two display panels of the present three-dimensional device both contain printed matter on a single common side. The present display carton is assembled by folding the first non-display panel behind the first display panel to form a combination front panel and thereafter arranging the second and third non-display panels as sides of the display carton with the second display panel disposed as the back of the carton. The tabs of the first display panel and the third non-display panel are then engaged in the complementary slits of the first non-display panel to complete the unit.

Other objectives and many of the attendant advantages of this invention will be readily appreciated as the same becomes better understood by reference to the following detailed description when conisdered in connection with the accompanying drawings wherein:

FIG. 5 is a plan view of a blank divided into appropriate printed display panels and plain non-display panels which may be assembled to form the device of FIG. 1;

FIG. 6 is a perspective view of a first modified form of the device of FIG. 1;

FIG. 7 is a perspective view of a second modified form of the device of FIG. 1;

FIG. 8 is a fragmentary perspective view taken generally from the rear of the device of FIG. 6 and showing in addition hanger means stamped from the rear display panel; and FIG. 9 is a plan view of a blank similar to that of FIG. 5 but so constructed to be assembled to form the device of FIG. 6.

FIG. 10 is a sectional view similar to FIG. 3 but of a slightly modified device.

Figure 1:
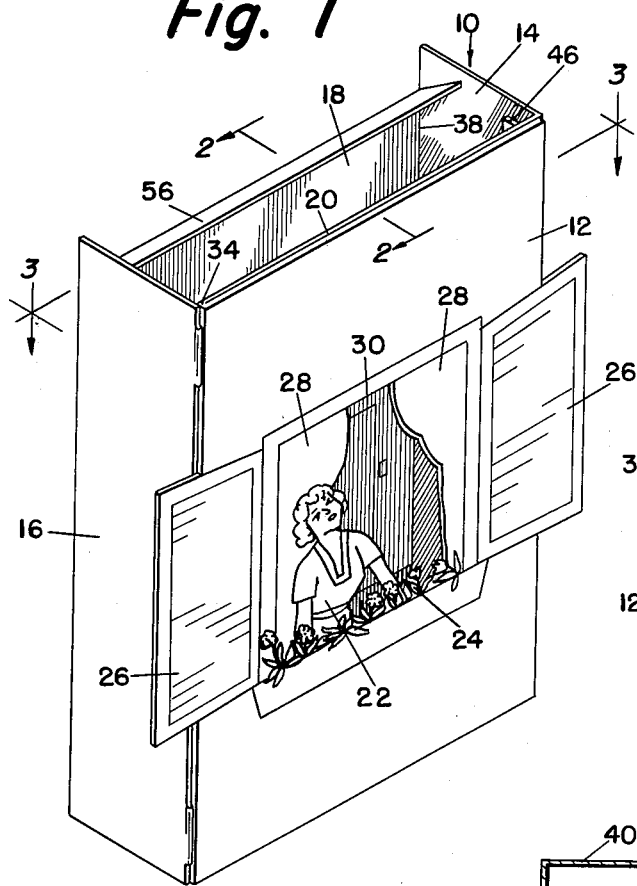
FIG. 1 is a perspective view of a first embodiment of the present invention.

Referring now in greater detail to the various figures of the drawings wherein similar reference characters refer to similar parts, a three-dimensional display device embodying the present invention is generally shown at 10 in FIG. 1 and includes a front panel 12, side panels 14 and 16, rear panel 18 and front non-display panel 20.

Front panel 12 may be appropriately die stamped to include display material, such as, a woman 22, flowers 24, shutters 26 and curtains 28. The display material is located on the front surface of front panel 12 and is colorfully printed to enhance the attractiveness and advertising value of display carton 10. A central opening 30 is provided in front panel 12 for reasons which will follow.

Figure 2:
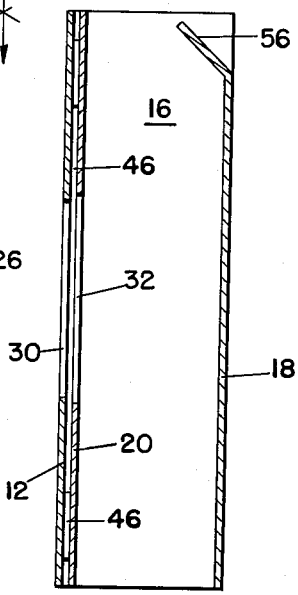
FIG. 2 is a sectional view taken along the lines 2—2 of FIG. 1.
Figure 3:
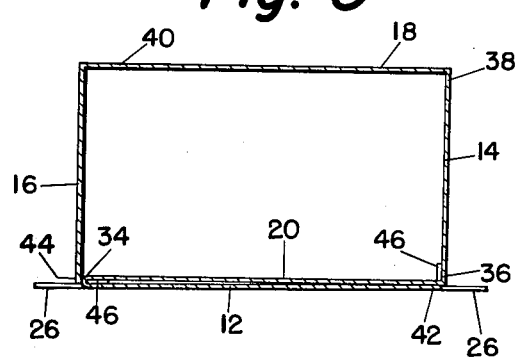
FIG. 3 is a sectional view taken along the lines 3—3 of FIG. 1.

Front non-display panel 20 is plain and unprinted and includes a central aperture 32 (FIG. 2) which is complementary with central opening 30 in order that the rear panel 18 of the display device may be viewed. Front non-display panel 20 is folded behind and abuts against front panel 12 as seen in FIGS. 1 to 3. It will be soon seen that non-display panel 20 thereby functions as an "idler" wall which enables front and rear display panels 12 and 18 to be printed in a single pass through the printing press and thereby effect great economy without affecting the quality of the finished product.

Panels 12 and 20 are hingedly integral along common edge 34. Side panel 14 is hingedly integral with plain panel 20 along common edge 36. Rear display panel 18 is hingedly integral with side panel 14 along common edge 38, and side panel 16 is hingedly integral with rear panel 18 along common edge 40.

Figure 4:
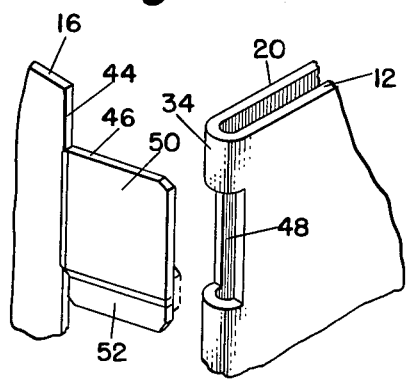
FIG. 4 is a fragmentary enlarged perspective view of a tab and complementary locking slit of the device of FIG. 1.

Free end 42 of front panel 12 and free end 44 of side panel 16 are secured to the remainder of the device by tabs 46 (FIG. 4) which project therefrom and which are secured in complementary slits 48 (FIG. 4) in front non-display panel 20. Tabs 46 include a major upper flap 50 and a lower folding portion 52. Tabs 46 are inserted into a complementary slit 48 by folding lower portion 52 thereof against flap 50 in order that the entire tab may be inserted into slit 48. After insertion lower portion 52 is unfolded to its initial portion to complete the joint.

Rear panel 18 contains printed matter 54 on its front face as viewed in FIG. 1 so that it harmonizes with the printed matter on the front face of front panel 12 to create a three-dimensional effect. A flap 56 is formed in rear panel 18 to enhance the overall attractiveness of the device. It should be noted that side panels 14 and 16 are plain since they are not readily within view although where the central opening and aperture 30, 32 permit, these panels may be decorated. Also flap 56 functions to maintain the retangular shape of carton 10.

It is thus seen that rear panel 18 may be viewed through complementary opening and aperture 30, 32 and that the decorative matter on front panel 12 is accordingly modified by the decorative matter on the front face of rear panel 18 to create a three-dimensional effect. A study of the blank 58 of FIG. 5 shows that all printing of blank 58 is but on a single side thereof, made by a single pass through a printing press. Where printing in color is involved, it is clear that great economies are effected by the present invention.

Blank 58 (FIG. 5) is assembled in the following manner with reference also made to FIG. 3: Front non-display or idler panel 20 is folded behind front panel 12 with printed matter 22, 24, 26, 28 exposed outwardly. Plain side panel 14 is bent at right angles to panels 12 and 20 along common edge 36. Rear display panel 18 is bent at right angles to side panel 14 to be behind and parallel to panels 12 and 20 so that printing 54 thereof may be viewed through opening 30 and aperture 32. Plain side panel 16 is bent at right angles to rear panel 18 to complete the rectangle. Tabs 46 of side panel 16 are inserted in slits 48 of front non-display panel and are locked between front panel 12 and panel 20 (FIG. 3). Tabs 46 of front panel 12 are inserted in slits 48 and are locked against the interior face of side panel 14.

A slightly modified form of the invention is shown in FIG. 10 wherein side panels 14 and 16 are eliminated and rear display panel 18 bent into a semi-circular shape to complete the carton with tabs 46 formed in free edge 40' of panel 18. Alternatively (not shown) additional display or non-display panels may be interposed between side panels 14 or 16 and rear display panel 18. Also the panels 14, 16 and 18 may be corrugated vertically or horizontally to lend to the attractiveness of the final device. It should be noted that all modifications of the invention retain the front non-display panel or idler panel 20 folded behind front panel 12. In this manner decorative or printed matter is still imposed on the front and rear display panels by a single pass through the printing press.

Other modifications of the invention are illustrated in FIGS. 6 to 9 wherein tabs 46 are eliminated and staples 60 substituted therefor. A flap 62 is associated with the free end 44' of side panel 16' to complete the securement of overlapped panels 12' and 20' to side panel 16 (FIG. 6). Free end 42 of front panel 12' is secured to panel 20' via staples 60.

It should also be noted that a tab 64 of front non-display panel 20' may be retained when central aperture 32' is formed therein. Tab 64 includes a locking flap 66 at its rear edge which is fastened in a horizontal slit 68 in rear display panel 18' to form a shelf to hold additional display matter. Tab 64 may be alternatively brought forward (FIG. 7) to the front of front display panel 12' and may be corrugated or bent to form steps 70 as a further ornamental feature. FIG. 9 shows a blank which may be assembled to form the device of FIG. 6 or alternatively the device of FIG. 7 provided tab 64 is corrugated or bent as in FIG. 7. However, tab 64 may be alternatively formed from front panel 12' when central opening 30' is formed therein.

As a further modification of this invention ears 70 (FIG. 8) can be punched from rear display panel 18' below tab 64 and thereby be hidden from view. Ears 70 include a central aperture 72 whereby a pole or supporting rod (not shown) may be inserted therethrough. Additionally where an easel is desired, flaps 74 (FIG. 8) may be formed from rear display panel 18'.

The display carton or device may be adapted to function either as a display or as a combination shipper and display for mass merchandise. In other words the display device of the present invention may serve as an ordinary carton during transit to hold one or more pieces of merchandise which will be eventually displayed in connection with the display device.

Obviously many modifications and variations of the present invention are possible in the light of the above teachings. It is, therefore, to be understood that within the scope of the appended claims the invention may be practiced otherwise than as specifically disclosed.

What is claimed as the invention is:

1. A foldable three dimensional display device comprising a first front panel having an opening therein, a second front panel having an aperture at least partially complementary with said opening, said second front panel being folded behind and substantially against said first front panel, a rear panel spaced from said first and second front panels whereby said rear panel may be viewed through said opening and aperture, and means associated with the free edges of said panels to secure the same to the remainder of the device to provide a stable free-standing device.

2. The invention of claim 1 including side panels bridging said front and rear panels wherein at least one of said front panels and said rear display panel have printed matter on their front surfaces, said panels being folded from a continuous surface.

3. The invention of claim 1 wherein a tab extends backwardly from said second front panel and is secured to the rear display panel to form a shelf.

4. The invention of claim 1 wherein a tab extends forwardly from said second front panel to the front of said display panel to form steps.

5. The invention of claim 1 wherein ears each having a central aperture constituting hanging means are punched from said rear display panel and are adapted to be associated with a supporting rod.

6. The invention of claim 1 wherein easel flaps constituting support means are formed from said rear display panel.

7. The invention of claim 1 wherein said opening and aperture are centrally located in their respective panels.

8. The invention of claim 1 wherein said second front panel is secured to said first front panel.

9. A blank adapted to be assembled into a foldable three dimensional display device comprising a first front panel having an opening therein, a second front panel having an aperture therein adapted to be at least partially complementary with said opening, said second front panel being associated with said first front panel along a common edge which is adapted to be folded whereby said second front panel lies behind and substantially against said first front panel, a rear display panel adapted to be spaced from said front panels whereby said rear panel may be viewed through said opening and aperture, and means associated with the free edges of said panels adapted to secure the same to the remainder of the device to provide a stable, free-standing device.

References Cited in the file of this patent

UNITED STATES PATENTS

| | | |
|---|---|---|
| 1,130,782 | Willen | Mar. 9, 1915 |
| 1,499,891 | Storer | July 1, 1924 |
| 1,991,044 | Bean | Feb. 12, 1935 |
| 2,203,578 | Podmore | June 4, 1940 |
| 2,580,241 | Podmore | Dec. 25, 1951 |
| 2,742,723 | Klein et al. | Apr. 24, 1956 |

FOREIGN PATENTS

| | | |
|---|---|---|
| 101,994 | Australia | Sept. 6, 1937 |
| 658,088 | Great Britain | Oct. 3, 1951 |